UNITED STATES PATENT OFFICE.

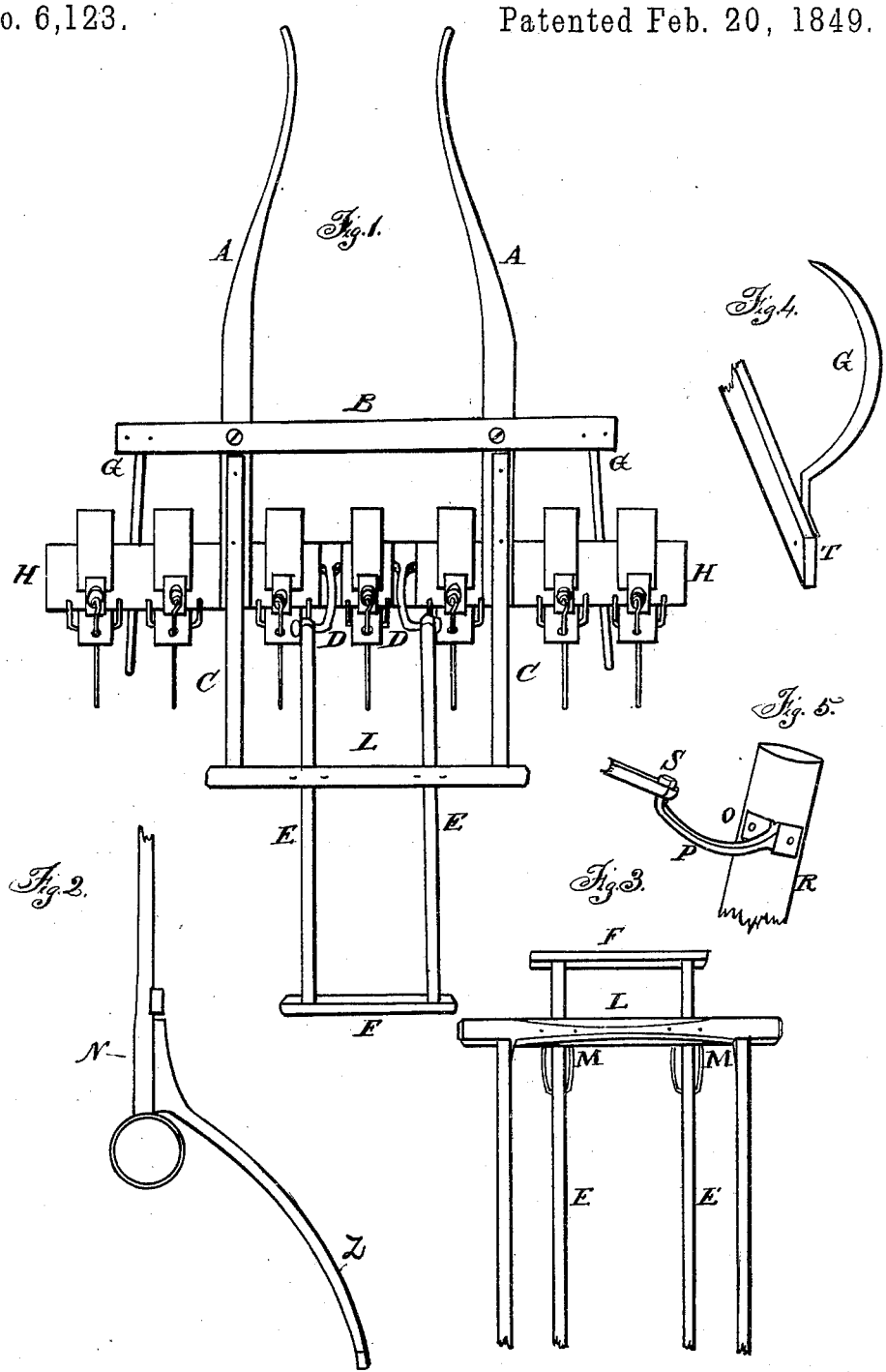

SAMUEL H. GRINNELL, OF CHARLESTOWN, NEW HAMPSHIRE.

IMPROVEMENT IN HORSE-RAKES.

Specification forming part of Letters Patent No. 6,123, dated February 20, 1849.

*To all whom it may concern:*

Be it known that I, SAMUEL H. GRINNELL, of Charlestown, in the county of Sullivan and State of New Hampshire, have invented a new and useful Improvement in a Revolving Horse-Rake; and I do hereby declare that the following is a full, clear, and exact description of the construction and operation of the same, reference being had to the annexed drawings, making a part of this specification, in which—

Figure 1 is a bird's-eye view of the rake, and the other figures are representations of different parts of the machine, as hereinafter described.

The pins A A, Fig. 1, are the thills of the rake.

B, Fig. 1, is a cross-bar bolted onto the thills at a convenient distance from the extremities, and of a convenient length according to the size of the rake.

G G, Fig. 1, are supporters, which may be of wood or iron or any suitable material, elastic or inelastic, and bolted onto the cross-bar B, Fig. 1, at a short distance from its extremities.

At G, Fig. 4, is represented the shape of the supporters, and at T, Fig. 4, the manner in which they are bolted onto the cross-bar B, Fig. 1. These supporters must be so made as to keep the rake-head H H, Fig. 1, at a convenient height from the ground, which will depend on the length and shape of the teeth.

C C, Fig. 1, are two pieces shaped as shown at Z, Fig. 2, and bolted onto the thills, as shown at N, Fig. 2, and which, together with the cross-bar L, Fig. 1, are intended to steady and support the handle E F E, Fig. 1. The pieces E E, Fig. 1, of the handle pass under the cross-bar L, Fig. 1, through iron loops or staples, as shown at M, Fig. 3, the staples or loops M M being such as to admit of the pieces E E, Figs. 1 and 3, sliding readily through them. The pieces E E, Figs. 1 and 3, may pass over the cross-bar L, Figs. 1 and 3, instead of passing under it. The cross-bar F, Figs. 1 and 3, is to be held in the hand.

Instead of the supporters G G, Fig. 1, wheels of suitable dimensions, fitted onto the ends of the cross-bar B, Fig. 1, may be used.

The pieces D D, Fig. 1, are iron cranks, shaped and bolted onto the rake-head, as shown at R O P, Fig. 5, and passing through holes in the extremities of the pieces E E, Figs. 1 and 3, and keyed on or screwed with nuts, as shown at S, Fig. 5, so as to turn in the holes when the handle is drawn backward and forward. When the rake is in operation, by drawing the handle E F E, Fig. 1, back, as seen in Fig. 1, the teeth are brought near the ground, so as to gather the hay as the rake is drawn along by the horse, and by shoving forward the handle the rake-head is made to perform about a quarter of a revolution, the teeth are raised up, and the hay drops out in a windrow.

What I claim, and desire to secure by Letters Patent, is—

The application of the crank-levers D D and handle E F E for rotating the rake-head, in the manner and for the purposes described, for charging and discharging the rake.

SAMUEL H. GRINNELL.

Witnesses:
W. H. DELANO,
EDMUND L. CUSHING.